(12) United States Patent
Jiang et al.

(10) Patent No.: US 8,254,622 B2
(45) Date of Patent: Aug. 28, 2012

(54) PORTABLE ELECTRONIC DEVICE WITH DETACHABLE SPEAKER

(75) Inventors: Bin Jiang, Shenzhen (CN); Man-Zhong Wang, Shenzhen (CN); Yong He, Shenzhen (CN); Jian-Zong Qin, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 236 days.

(21) Appl. No.: 12/824,802

(22) Filed: Jun. 28, 2010

(65) Prior Publication Data
US 2011/0235846 A1 Sep. 29, 2011

(30) Foreign Application Priority Data
Mar. 29, 2010 (CN) .......................... 2010 1 0134660

(51) Int. Cl.
*H04R 1/02* (2006.01)
(52) U.S. Cl. ........ 381/386; 381/333; 381/334; 381/387; 381/388
(58) Field of Classification Search .................. 381/332, 381/333, 334, 386, 387, 388; 181/148, 199
See application file for complete search history.

(56) References Cited

U.S. PATENT DOCUMENTS

| | | | | |
|---|---|---|---|---|
| 4,450,495 A * | 5/1984 | Naruki | ........................... | 360/137 |
| 5,190,258 A * | 3/1993 | Yu | ............................... | 248/279.1 |
| 5,812,369 A * | 9/1998 | Hsu et al. | .................... | 361/679.6 |
| 5,825,614 A * | 10/1998 | Kim | ........................... | 361/679.55 |
| 5,852,545 A * | 12/1998 | Pan-Ratzlaff | ............ | 361/679.23 |
| 5,947,434 A * | 9/1999 | Kosmoski et al. | ........ | 248/298.1 |
| 6,151,206 A * | 11/2000 | Kato et al. | ............... | 361/679.26 |
| 6,151,401 A * | 11/2000 | Annaratone | ................. | 381/388 |
| 6,181,550 B1* | 1/2001 | Kim | ........................... | 361/679.06 |
| 6,542,616 B1* | 4/2003 | Nobuchi | ........................ | 381/388 |
| 2003/0001055 A1* | 1/2003 | Harary et al. | ............ | 248/221.11 |
| 2005/0232451 A1* | 10/2005 | Peng | ............................. | 381/306 |
| 2006/0078143 A1* | 4/2006 | Yang | ............................. | 381/333 |
| 2007/0012166 A1* | 1/2007 | Vinson et al. | .................... | 84/723 |
| 2007/0014426 A1* | 1/2007 | Sung et al. | ..................... | 381/386 |
| 2007/0274547 A1* | 11/2007 | Ueno | ............................ | 381/306 |
| 2008/0304693 A1* | 12/2008 | Lau | ............................... | 381/388 |
| 2009/0080684 A1* | 3/2009 | Groset et al. | ................... | 381/387 |
| 2009/0180660 A1* | 7/2009 | Groset et al. | ................... | 381/386 |
| 2009/0290747 A1* | 11/2009 | Porter | ............................ | 381/388 |

* cited by examiner

*Primary Examiner* — Jeremy Luks
(74) *Attorney, Agent, or Firm* — Altis Law Group, Inc.

(57) ABSTRACT

A portable electronic device includes a audio player, a speaker, a fixing member and an engaging opening. The audio player is configured for playing audio files and videos. The speaker is detachably couple to the audio player. The fixing member is connected to one of the audio player and the speaker. The engaging opening is defined in the other of the audio player and the speaker. The engaging portion is detachably engaged in the engaging opening.

8 Claims, 4 Drawing Sheets

PORTABLE ELECTRONIC DEVICE WITH DETACHABLE SPEAKER

BACKGROUND

1. Technical Field

The present disclosure relates electronic devices, and particularly, to a portable electronic device.

2. Description of Related Art

Nowadays, many portable electronic devices have built-in speakers for emitting sound. However, because of limited space in portable electronic devices, the speakers are too small to provide quality sound. The portable electronic devices can be connected to external speakers with the use of cables for better effect, but the use of external speakers and cables limits the portability of the electronic devices.

What is needed therefore, is a portable electronic device addressing the above-mentioned problems.

BRIEF DESCRIPTION OF THE DRAWINGS

The components of the drawings are not necessarily drawn to scale, the emphasis instead being placed upon clearly illustrating the principles of the embodiments of the portable electronic device. Moreover, in the drawings, like reference numerals designate corresponding parts throughout several views.

DETAILED DESCRIPTION

Figure 1:
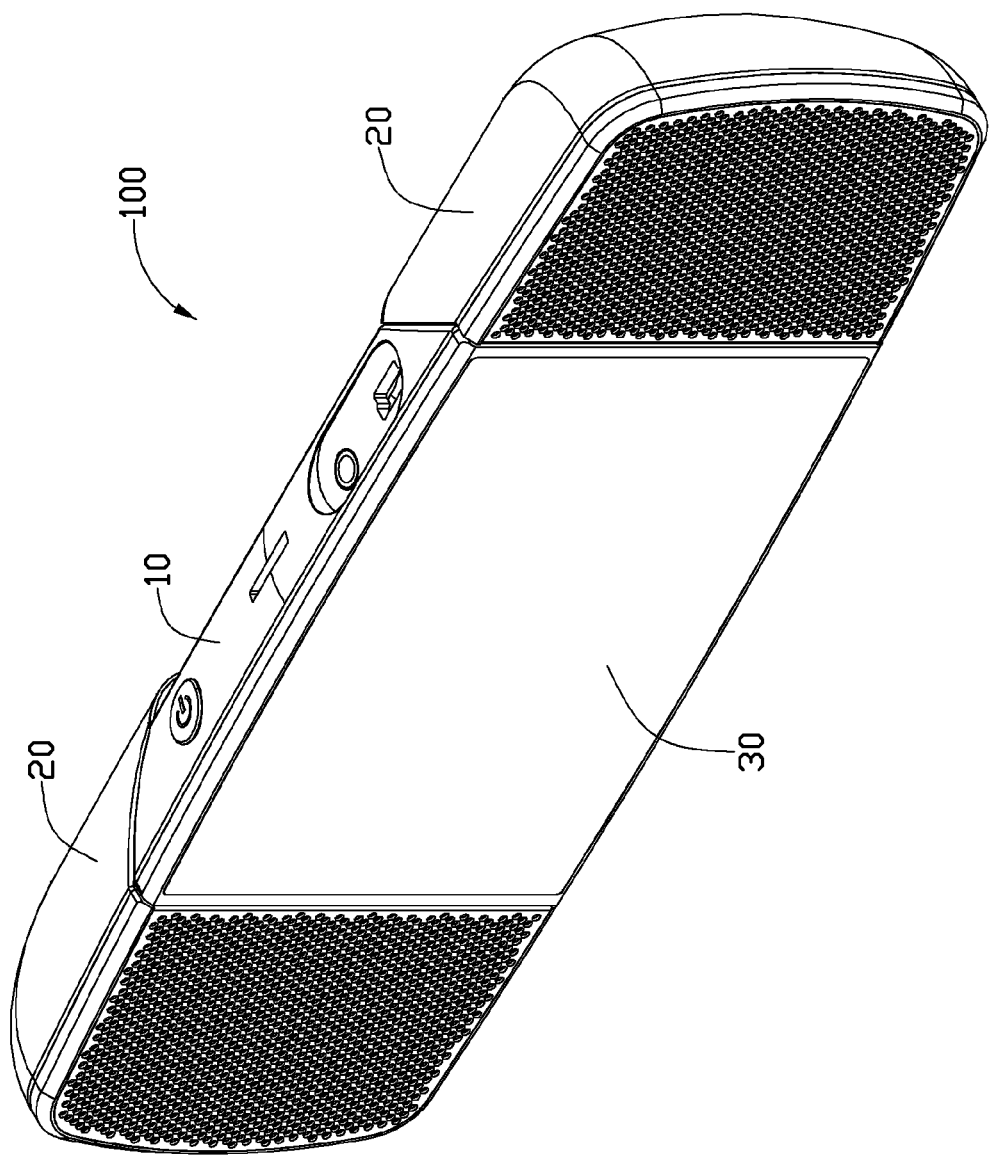
FIG. 1 is an isometric view of a portable electronic device according to an exemplary embodiment of the present disclosure, the portable electronic device including an audio player and two speakers.
Figure 2:
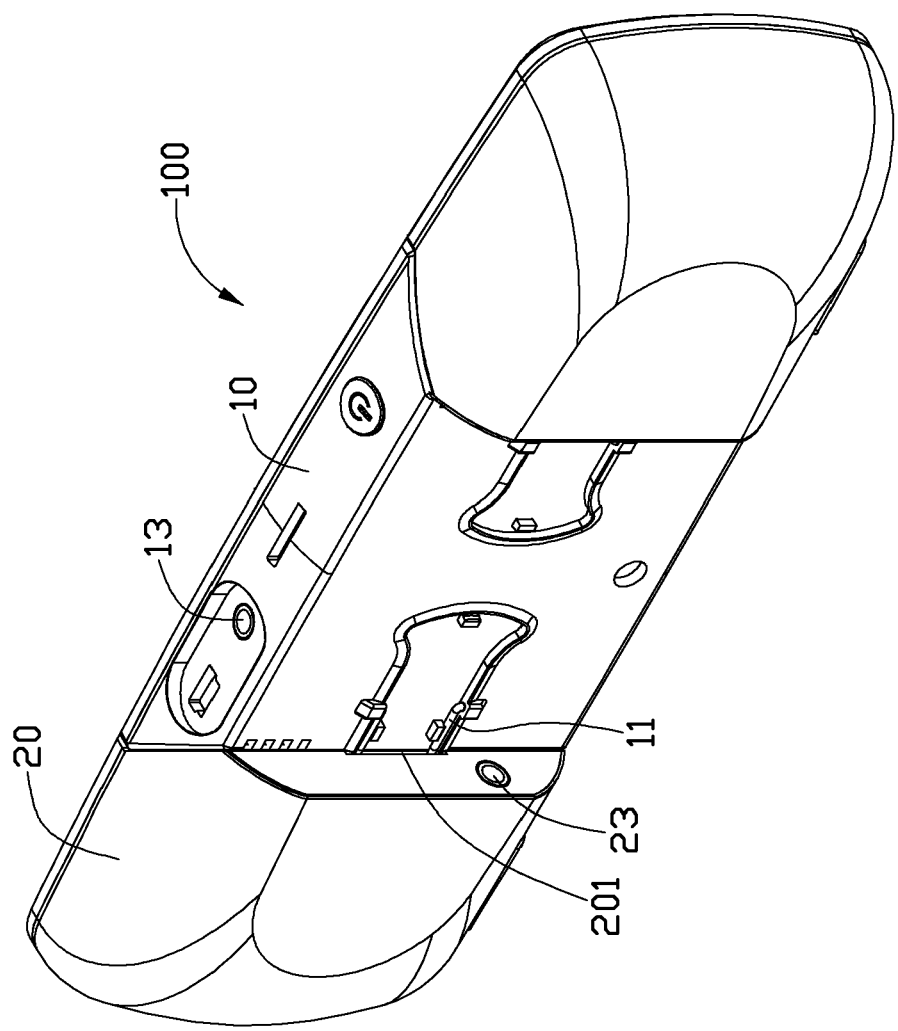
FIG. 2 is similar to FIG. 1, but showing the portable electronic device viewed from a different angle.

Referring to FIG. 1 and FIG. 2, a portable electronic device 100, according to an exemplary embodiment, is shown. The portable electronic device 100 includes an audio player 10 and two speakers 20 detachably connected to opposite ends of the audio player 10. The audio player 10 is configured for playing audio files and/or video files.

Figure 3:
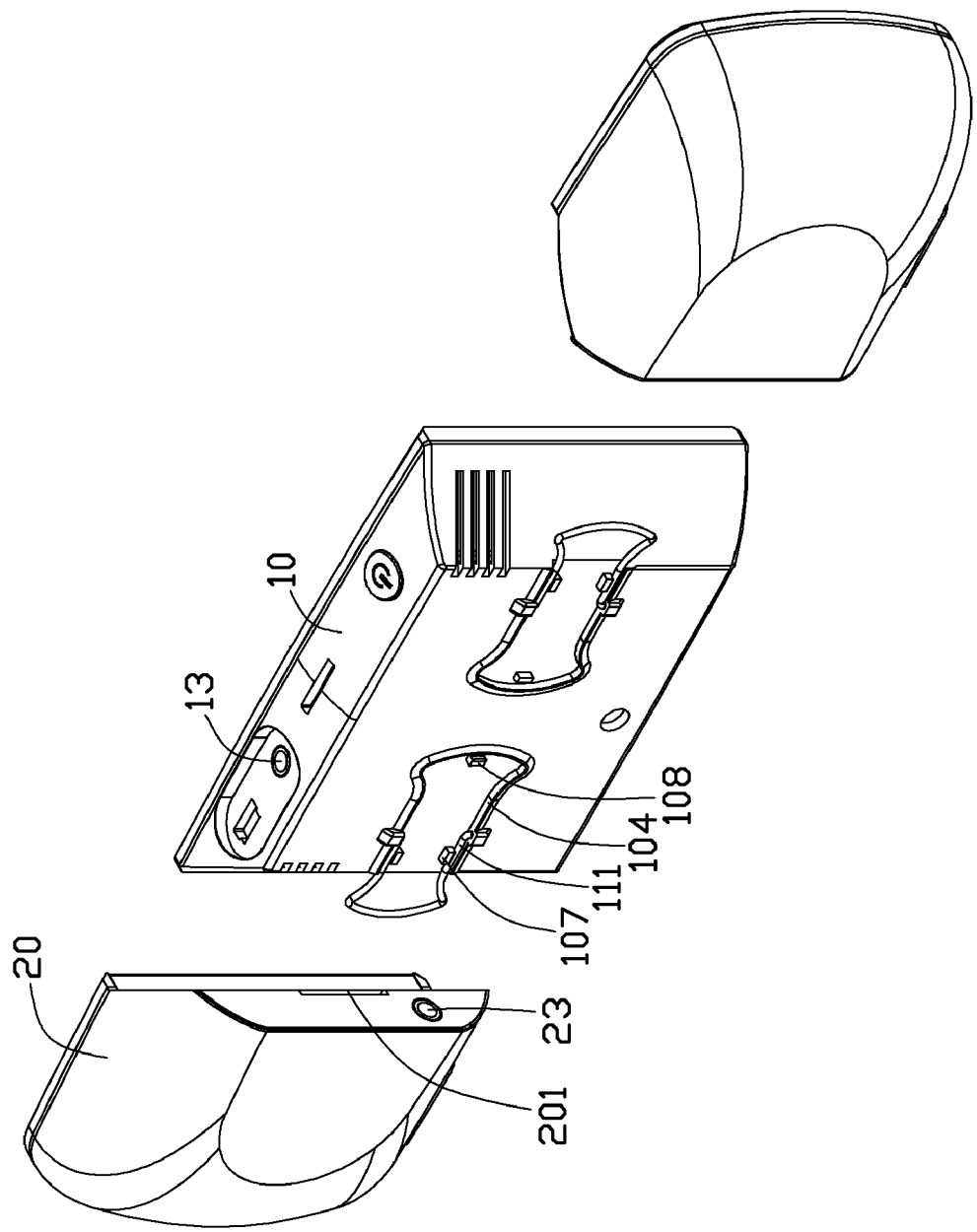
FIG. 3 is similar to FIG. 2, but showing the portable electronic device partially disassembled.
Figure 4:
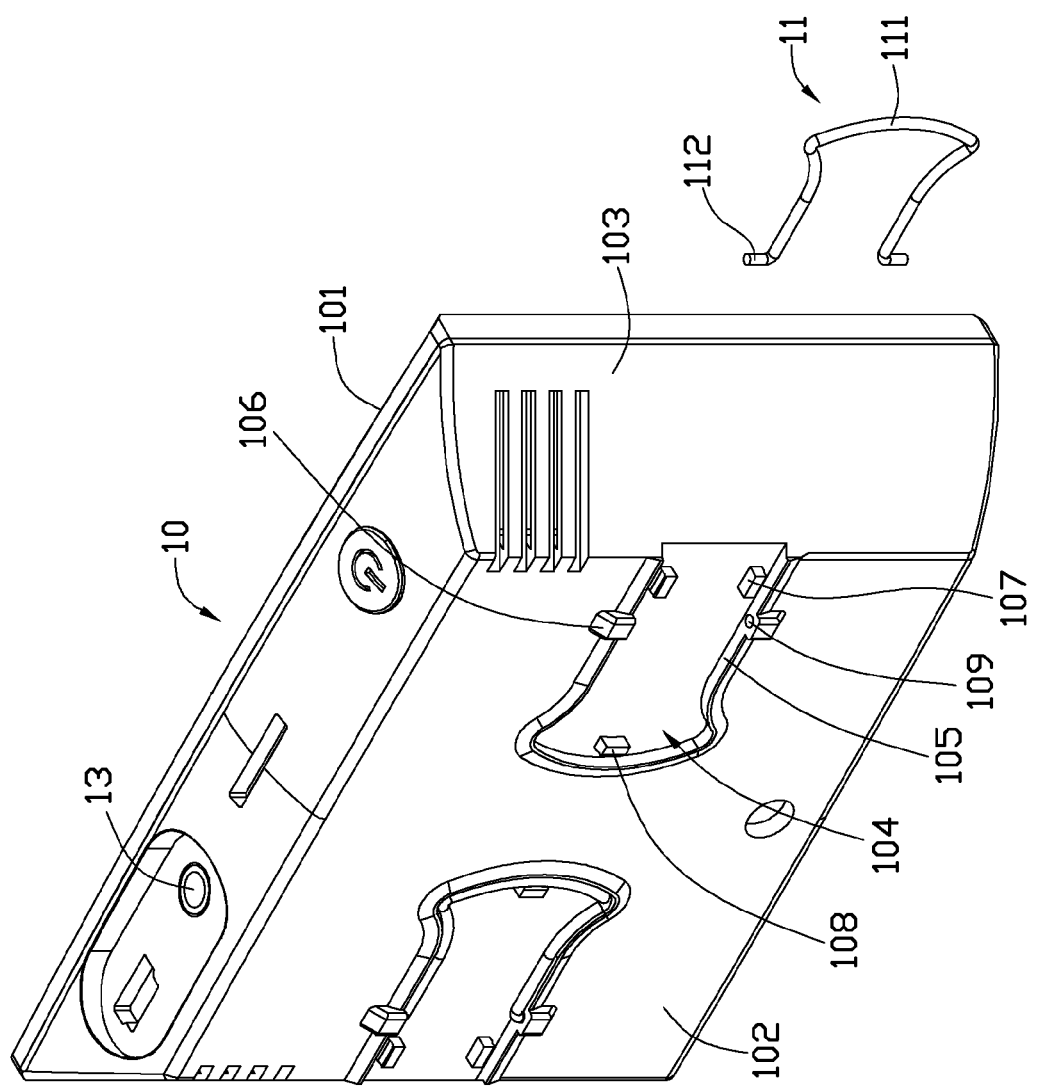
FIG. 4 is a partially exploded view of the portable electronic device of FIG. 3.

Referring to FIG. 3 and FIG. 4, the audio player 10 includes a first side surface 101, a second side surface 102 opposite to the first side surface 101 and two third side surfaces 103. The first side surface 101 and the second side surface 102 are substantially parallel to each other. The third side surfaces 103 are inclined relative to the first side surface 101 and the second side surface 102, and the audio player 10 tapers from the first side surface 101 to the second side surface 102. In this embodiment, the first side surface 101 is the top surface of the audio player 10, the second side surface 102 is the bottom surface of the player 10 and the third side surfaces 103 are the lateral surfaces of the player 10. The portable electronic device 100 further includes a display screen 30 mounted on the first side surface 101 of the audio player 10. The audio player 10 includes a receiving portion 105 formed on the second surface 102 thereof. The receiving portion 105 is substantially U-shaped and protrudes from the second surface 102. The receiving portion 105 defines a receiving space 104 in the second surface 102. The receiving portion 105 includes two fixing blocks 106 arranged on opposite sides of the receiving portion 105. Each fixing block 106 defines a shaft hole 109. The audio player 10 includes two first restricting blocks 107 and a second restricting block 108. The first restricting blocks 107 are fixed in the receiving space 104 adjacent to the open end of the receiving portion 107, and a space is maintained between each first restricting block 107 and the receiving portion 105. The second restricting block 108 is positioned in the receiving space 104 adjacent to the closed end (curved part of the U-shape) of the receiving portion 105, and a space is maintained between the second restricting block 108 and the receiving portion 105. The audio player 10 further defines a first audio connecting hole 13.

The audio player 10 includes a fixing member 11 rotatably connected to the receiving portion 105. The fixing member 11 includes an engaging portion 111 and two shaft portions 112. The engaging portion 111 is shaped conforming to the receiving portion 102 and can be fitly received into the receiving space 104. The shaft portions 112 are respectively connected to two distal ends of the engaging portion 111. In assembly, each shaft portion 112 is rotatably inserted into a corresponding shaft hole 109. The engaging portion 111 can be rotated to the closed end of the receiving portion 105 and restricted by the second restricting block 108, or can be rotated to the open end of the receiving portion 105 and restricted by the first restricting blocks 107. The engaging portion 111 is substantially U-shaped, and can be elastically deformed. In this embodiment, the engaging portion 111 and the shaft portions 112 are integrally formed with each other and both made from metal materials.

Each speaker 20 defines an engaging opening (slot) 201 corresponding to an engaging portion 111 on the side surface thereof. The speaker 20 further defines a second audio connecting hole 23 corresponding to the first audio connecting hole 13.

Alternatively, each receiving portion 105 can be formed on a corresponding speaker 20, thus the fixing members 105 are rotatably connected to the speaker 20. And accordingly, the engaging openings 201 can be defined in the audio player 10.

To use the speakers 20 with the audio player 10, the speakers 20 are mounted to opposite sides of the audio player 10. In detail, each of the engaging portions 111 is rotated to the open end of the receiving portion 105, the open end of the engaging portion 111 is restricted between the corresponding first restricting blocks 107 and the receiving portion 105, the closed end of the engaging portion 111 is engaged in a corresponding engaging hole 23. The first audio connecting hole 13 and the second audio connecting holes 23 are electrically connected to each other by an audio cable (not shown).

When the speakers are not needed, the speakers 20 can be detached from the audio player. In detail, each engaging portion 111 is disengaged from a corresponding engaging hole 23 and rotated to the closed end of the receiving portion 105, and the closed end of the engaging portion 111 is restricted between the second restricting block 108 and the receiving portion 105.

Therefore, it is convenient to connect the audio player 10 to the speakers 20, and the assembled portable electronic device 100 can be kept a compact size and convenient to carry.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A portable electronic device, comprising:
an audio player capable of playing audio files;
a speaker detachably coupled to the audio player;

a fixing member rotatably connected to the audio player, the fixing member comprising an engaging portion, the engaging portion being substantially U-shaped, the audio player comprising a receiving portion shaped conforming to the engaging portion and having an open end and a close end; and an engaging opening defined in the speaker, the engaging portion being detachably engaged in the engaging opening.

2. The portable electronic device of claim 1, wherein the audio player comprises a first side surface, a second side surface opposite to the first side surface, and two third side surface, the first side surface and the second side surface are substantially parallel to each other, the third side surfaces are inclined relative to the first side surface, and the audio player tapers from the first side surface to the second side surface.

3. The portable electronic device of claim 2, wherein the receiving portion is formed on the second surface and protrudes from the second surface, the receiving portion defines a receiving space on the second surface.

4. The portable electronic device of claim 2, wherein the receiving portion comprises two fixing blocks arranged on opposite sides of the receiving portion, each fixing block defines a shaft hole, the fixing member comprises two shaft portions respectively connected to two distal ends of the engaging portion, each shaft portion is rotatably inserted into a corresponding shaft hole.

5. The portable electronic device of claim 2, wherein the audio player includes two first restricting blocks and a second restricting block, the first restricting blocks are fixed in the receiving space adjacent to the open end of the receiving portion, a space is maintained between each first restricting block and the receiving portion, the second restricting block is positioned adjacent to the close end of the receiving portion with a space maintained between the second restricting block and the receiving portion.

6. The portable electronic device of claim 1, further comprising an audio cable for electrically coupling the audio player to the speaker.

7. A portable electronic device, comprising:
a multimedia player device including a top surface, a bottom surface, and two lateral third side surfaces;
a display screen mounted on top surface;
two fasteners pivotedly mounted on the bottom surface, each fastener being a substantially U-shaped spring member and having two legs and an intermediate portion interconnected between the legs, the two legs pivotedly coupled to the multimedia player device, the intermediate portions protrudable beyond the lateral faces to engage with the corresponding speakers; and
two speakers mounted to the lateral surfaces of the multimedia player device respectively, the speakers detachably coupled to the respective fasteners.

8. The portable electronic device of claim 7, wherein each speaker includes a slot snappingly engaged with the intermediate portion of the respective fastener.

* * * * *